US 6,551,421 B1

(12) United States Patent
Rabinkin (10) Patent No.: US 6,551,421 B1
(45) Date of Patent: Apr. 22, 2003

(54) BRAZING FOIL PERFORMS AND THEIR USE IN THE MANUFACTURE OF HEAT EXCHANGERS

(75) Inventor: Anatol Rabinkin, Morris Plains, NJ (US)

(73) Assignee: Honeywell International Inc., Morris Township, NJ (US)

(*) Notice: Subject to any disclaimer, the term of this patent is extended or adjusted under 35 U.S.C. 154(b) by 0 days.

(21) Appl. No.: 09/716,568

(22) Filed: Nov. 20, 2000

(51) Int. Cl.[7] ............................................. C22C 45/00
(52) U.S. Cl. ...................... 148/403; 428/606
(58) Field of Search .................. 148/304, 403; 428/606

(56) References Cited

U.S. PATENT DOCUMENTS

| 4,169,744 A | 10/1979 | D'Silva .................. 148/32 |
| 4,250,229 A | 2/1981 | Kear et al. ................ 428/606 |
| 4,260,666 A | 4/1981 | DeCristofaro et al. ...... 428/668 |
| 4,480,016 A | * 10/1984 | Henschel ................ 148/403 |
| 4,676,298 A | * 6/1987 | Liebermann ............. 164/463 |
| 4,801,072 A | * 1/1989 | Henschel ............... 228/245 |

FOREIGN PATENT DOCUMENTS

| EP | 0 014 335 | 8/1980 |
| EP | 0 337 102 | 10/1989 |
| WO | 97/34732 | * 9/1997 |

OTHER PUBLICATIONS

Olson, H., "How to Design for Preform Brazing", Welding Engineer, Sep. 1960, pp. 36–39.

* cited by examiner

Primary Examiner—George Wyszomierski
(74) Attorney, Agent, or Firm—Roger H. Criss (57) ABSTRACT

Preformed articles of an amorphous metal foil which are particularly adapted to be used in the manufacture of an assembly having brazed joints, especially a heat exchanger. Methods for the manufacture of a heat exchanger or other assembly having brazed joints, which method includes the process step of providing a preformed article formed of a brazing foil composition of an amorphous metal alloy in contact with one or more elements of said heat exchanger or other assembly.

11 Claims, 6 Drawing Sheets

BRAZING FOIL PERFORMS AND THEIR USE IN THE MANUFACTURE OF HEAT EXCHANGERS

FIELD OF THE INVENTION

The invention generally relates to preformed articles formed of a brazing foil, as well as methods for the manufacture of assemblies which include said preformed articles.

BACKGROUND OF THE INVENTION

Brazing is a process for joining parts, often of dissimilar compositions, to each other. Typically, a filler metal that has a melting point lower than that of the parts to be joined together is interposed between the parts to form an assembly. The juncture of the assembled parts and the filler metal is then heated to a temperature sufficient to melt the filler metal but generally lower than the melting point of the parts. Upon cooling, ideally a strong, void free joint is formed.

Brazing in widely used in the manufacture of various assemblies, which themselves may be finished articles which may be used or sold, or which assemblies may be components of such articles. One class of products produced by brazing processes are heat exchangers. Such may take a wide variety of configurations, but those which are referred to as shell-and-tube type, and plate type heat exchangers are most usually encountered. In the former configuration, a larger diameter housing typically referred to as a "shell" and encompasses one or more small diameter "tubes" or pipes. According to this configuration, a first fluid (liquid, gas) passes through the shell and about the exterior of the tubes while simultaneously a second fluid (liquid, gas) passes through the interior of the tubes. While no physical contact is permitted between the first and second fluids, heat transfer occurs across the tubes. In plate heat exchangers, one or more plates separate a first fluid from a second fluid while heat transfer occurs across the plate. In these types of heat exchangers (as well as in other assemblies), metals are most commonly used due to their high strength and good heat transfer characteristics. Typically, the individual parts which are used to make up these types of heat exchangers are joined by brazing. Thus, it is imperative that joints exhibit high strength, and be resistant to potential detrimental effects which might result from contact with one or both of the fluids.

In order to meet these requirements, the materials of construction for heat exchangers may be carefully selected. Stainless steels are very commonly encountered in heat exchangers as they exhibit advantageous properties including good mechanical strength and good corrosion resistance. Nonetheless other metals also find use in heat exchangers as well.

The manufacture of heat exchangers, especially those of the shell-and-tube variety is frequently very labor intensive, often requiring a significant number of manual assembly steps. For example, in shell and tube heat exchangers a plurality of tubes are inserted through a plate which has suitably sized holes for accepting the tubes. In order to form a pressure tight seal between the tubes and the plate, the junction between these elements need to be brazed. Typically, a brazing "paste" composition is used. Such a conventional brazing paste composition includes a brazing filler metal in a powder based form in conjunction with an organic binder as a carrier. In use, this brazing paste composition is deposited in the region of the junction between each tube and the plate. Subsequently, once the application of the aforesaid brazing paste composition is complete, the assembly is then brazed under appropriate conditions in order to drive off the organic binder and simultaneously to form a brazed joint between each individual tube and the plate used in the shell and tube heat exchanger. This operation is however unreliable as it is difficult to deposit equal amounts of brazing paste composition in each individual joint area. It also results in substantial joint porosity due to poor fusion of the powder particles. In addition this manually controlled application process is frequently time-consuming, requires a great deal of manual skill, and requires very controlled handling during the complete process. Many risks are associated with such an assembly process, each of which will result in a failed joint in the brazed assembly.

One potential technical risk lies in the very nature of the brazing filler metal composition which is used. As this must be spread at the joint, and retained there, it is inevitable that a thickening agent, typically one or more organic materials need be present. These ideally are driven off during the heating stage when brazing actually occurs, but it is well known in the art that very frequently bubbles, fractures, or other discontinuities in the brazed joint result. Such of course are defects in the completed, and brazed assembly. In order to repair such defects, a rebrazing step is necessarily practiced in order to repair specific defects. Another technical risk attendant upon the current method of production lies in the fact that a very uniform distribution of the brazing material should be placed at the junction of each tube and the plate. This is necessitated as ideally, the thickness of the brazes should be essentially uniform so that under pressurized operating conditions, weak joints do not fail during the useful service life of the heat exchanger. Naturally, this may be difficult to perform reliably in a manual application process such as is currently known in the art. Occasional excessive paste deposition may result in excessive erosion or dissolution of the thin walls of the tubes, and may even lead to formation of holes in the tube walls. A still further technical risk which exists relates to the handling of the shell and tube assembly subsequent to or during the application of the brazing filler metal as well as the composition of the brazing filler metal. Typically the brazing filler metal used in such a manual operation includes a minimal amount of an organic binding agent and/or other organic materials. Due to the known problems associated with the presence of such organic materials, a minimization of their presence is desirable. Unfortunately, minimization of such undesirable organic materials also deleteriously affects the spreadability well as the adhesive characteristics of such a brazing filler metal comprising composition. Thus, it is not unknown that dislocation or movement of the one or more tubes on the plate during the assembly process at any point up until the formation of the brazed joint can occur. This is particularly likely where large number tubes are to be assembled and especially where two plates in opposite ends of the tubes need be concurrently assembled. Again, any failure in the placement and retention of the brazing filler metal composition up until the actual formation of the brazed joint also manifests itself in failed brazed joints in such heat exchangers. A still further technical risk which is present is the difficulty in forming small heat exchangers wherein one or more relatively small diameter thin walled tubes need to be brazed to one or more end plates. Fabrication of assemblies of small diameter, thin walled tubes are troublesome as they require a very precise application of a brazing filler metal composition at the juncture between each tube and each plate. At the same time, in such small heat exchangers, it is also very desirable to use only a very minimal, but sufficient amount of the brazing filler metal to form each joint. Unfortunately, it is known to be difficult to place precise amounts, in precise locations, of brazing filler metals even with the use of syringes, or other type of delivery apparatuses. From the foregoing it is apparent that there is a real and continuing need in the art relating to the production of brazed assemblies, particularly shell-and-tube heat exchangers.

Accordingly, it is to one or more of these technical needs that the present invention is directed.

SUMMARY OF THE INVENTION

In a first aspect, the present invention provides preforms of an amorphous metal alloy which are particularly adapted to be used in the manufacture of an assembly having brazed joints, especially a heat exchanger.

In a second aspect, the present invention relates to methods for the manufacture of a heat exchanger or other assembly having brazed joints, which method includes the process step of providing a preforms of an amorphous metal alloy in contact with one or more elements of said heat exchanger or other assembly.

In a third aspect of the invention there are provided heat exchangers and other assemblies having brazed joints which are manufactured utilizing preforms of an amorphous metal alloy as described herein.

In a fourth aspect of the invention there are provided heat exchangers and other assemblies having brazed joints which are manufactured by a method including the process steps of providing a preform of an amorphous metal alloy in contact with one or more elements of said heat exchanger or other assembly.

In this description and in the claims, the terms "preformed article" is interchangeably used with the term "preform" and "preformed article" to designate the brazing foil preforms described according to the invention.

Further features of the invention will become more apparent from the following description.

DETAILED DESCRIPTION AND PREFERRED EMBODIMENTS

As noted, the present invention provides methods for the manufacture of assemblies which included brazed metal components, and to preforms of brazing filler metals.

As is understood in the art, in any brazing process, a brazing filler metal must have a melting point that will be sufficiently high to provide strength to meet service requirements of the metal parts brazed together. However, the melting point must not be so high as to make the brazing operation difficult. Further, the filler material must be compatible, both chemically and metallurgically, with the materials being brazed.

The brazing filler metals particularly useful in the methods and assemblies according to the present invention are metal alloys which can be produced in various forms, powders, foils, ribbons or other forms according to well-known techniques. Methods commonly used to fabricate alloys in powder form include gas or water atomization as well as mechanical pulverization. Alloys of the present invention are most preferably formed into ductile foils, ribbons or wire by a rapid solidification process. Such rapid solidification processes are processes whereby a melt of molten material is solidified by quenching the melt by rapidly cooling at a rate of at least about $1 \times 10^{5\circ}$ C./sec although higher rates are known and more commonly used. Among the variety of rapid solidification processes available today, the most preferred process employs a rapidly rotating chill wheel onto which a molten alloy is deposited. Such a process is per se, known to the art.

Ideally, the brazing filler metals used according to the present invention are amorphous metal alloys in the form of a ductile foil which can be readily handled and which can be bent into three-dimensional preforms. Such bendable preforms are formed by folding portions of a planar ductile brazing foil into non-planar three dimensional forms adapted to fit contours in metal parts used in the assembly of manufactured assemblies. Formation into such non-planar complex shapes can occur by bending or stamping the ductile foil such that the deformation of the ductile foil is irreversible. Further, ideally, the brazing foil should be essentially homogeneous in its compositions, that is to say that it contains no binders, such as organic binders which would provide the potential for void formation or the deposition of contaminating residues during brazing.

Rapidly solidified products produced from homogeneous melts of the alloys are usually homogeneous in the solid state. The products may be glassy or crystalline depending upon the alloy compositions and processing parameters. In addition, products at least about 90% glassy usually exhibit sufficient ductility to enable foil and ribbon forms of the alloys to be bent to a radius as small as ten times their thickness without fracture. Preferably, the brazing filler metals of the present invention are metal alloys which are formed by rapidly solidifying a melt of the metal alloy at quenching rates of at least about 1×10⁵° C./sec. Such quenching rates produce alloys which are at least about 90% glassy and, as a result, are sufficiently ductile so as to enable them to be stamped into complex shapes. More preferably, the alloys of the present invention are at least about 92% glassy, and most preferably substantially glassy (i.e., at least about 95% glassy) because substantially glassy alloys exhibit the highest degree of ductility.

As noted previously, the preforms according to the invention are formed by folding portions of a planar ductile brazing foil into non-planar three dimensional forms adapted to fit contours in metal parts used in the assembly of manufactured assemblies. Formation into such non-planar complex shapes can occur by any suitable means for mechanically forming a preform form a planar ductile brazing foil, such as by bending or stamping the ductile foil such that the deformation of the ductile foil is irreversible, that is to say, that subsequent to deformation the preforms do not return to a two-dimensional planar state and further, that the brazing foils to not fracture or break during the deformation step. The alloys useful in the present invention are particularly suited as brazing filler metals for the methods described herein. Most preferably, the alloys are produced in foil form and are useful regardless of whether the foil is glassy or microcrystalline. The foils of the present invention typically are between about 0.0007 inches and about 0.004 inches (about 18 to 100 micrometers) thick. In many instances, the foil thickness corresponds to the desired spacing between parts to be brazed.

The brazing filler metals of the present invention are particularly useful for the joining of metal parts, and in particularly stainless steel parts. Exemplary grade of such stainless steels includes: steel S31603 according to UNS Classifications, as well as type 316L stainless steel which is described as typically containing approximately 0.03% wt. carbon, 2.00% wt. manganese, 1.0% wt. silicon, 16 to 18% wt. chromium, 10 to 14% wt. nickel, 2 to 3% wt. molybdenum, 0.1% wt. nitrogen and iron as the balance to 100% wt. It is of course contemplated that other materials which may benefit from the invention described herein and enjoy the benefits discussed herein. By way of non-limiting example these include other grades of stainless steel, as well as other corrosion resistant alloys such as those including nickel or chromium.

One class of brazing filler-metals of the present invention include nickel/chromium-based and nickel/cobalt/chromium-based brazing filler metals. Such brazing filler metals are believed to encompass most known Ni- and Ni/Cr-based alloys which are commonly used in brazing of stainless steel parts, which are designated by the American Welding Society specification ANSI/A5.8 as BNi- and BCo- series brazing filler metals. Particularly useful as the nickel/chromium-based brazing filler metals useful in the methods and manufactured articles according to the invention include metal alloy compositions which may be represented by the formula:

$$Ni_aCo_bCr_cB_dSi_eFe_fMo_gW_hX$$

where the subscripts "a", "b", "c", "d", "e", "f", "g", and "h" are all in weight percent and wherein, "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities which may be present to about 1 weight percent, and "a" is the balance to the total amount to 100. Preferably these nickel/chromium-based brazing filler metals consist essentially of the elements recited above. It is to be understood that the term "nickel/chromium-based brazing filler metals" encompasses alloys wherein chromium is absent, but as chromium is typically present the use of this term is retained.

Preferably, the nickel/chromium-based brazing filler metals are based on an alloy which is in a metastable structural state having at least about 90% percent glassy structure, more preferably having at least about 92% glassy structure, and most preferably having at least about 95% glassy structure. Such alloys are also frequently referred to in the art as "amorphous metal alloys". Further examples of nickel/chromium-based brazing filler metals based on alloys which may be used as brazing filler metals described herein and which are presently commercially available include: those referred to according to ANSI classification A5.8 (per the American Welding Society) as filler metals BNi-1, BNi-1a, BNi-2, BNi-5, BNi-7, BNi-9, BNi-10, BNi-11, and BCo-1 as well as sub-categories of each. Examples of preferred Ni- and Ni/Cr-based alloys useful as the nickel/chromium-based brazing filler metals which having chemical compositions as described above and which are presently commercially available include: BNi-2, BNi-5a, and BNi-5b compositions according to the above mentioned ANSI/A5.8 Classification. Ideally, the nickel/chromium-based brazing filler metals used according to the present invention are in ductile foil form which can be readily handled and when necessary, shaped to fit contours or shaped into necessary complex shapes. Further ideally, the nickel/chromium-based amorphous brazing filler metals are essentially homogeneous in composition and include no organic binders, such as organic binders which would provide the potential for void formation or the deposition of contaminating residues during brazing.

In a preferred aspect of the invention there is provided a method for the manufacture of a heat exchanger or other assembly having brazed joints, which method includes the process step of providing a brazing foil preform comprising an amorphous metal alloy in contact with one or more elements of said heat exchanger or other assembly and heating juxtaposed parts and the brazing material under appropriate conditions in order to cause the melting of the brazing material; and thereafter cooling the melted brazing filler alloy to produce a brazed joint.

Preferably in the process described above heating of the juxtaposed parts to cause the brazing of the parts occurs in a closed oven in the presence of a protective gas such as argon or nitrogen. Alternately, heating may occur in a closed oven under vacuum conditions as well and in certain instances is preferred. These brazing conditions are typically used in industry to achieve a high joint strength and integrity when using filler metals containing oxygen-active elements such as boron, silicon, and phosphorus.

Figure 1:
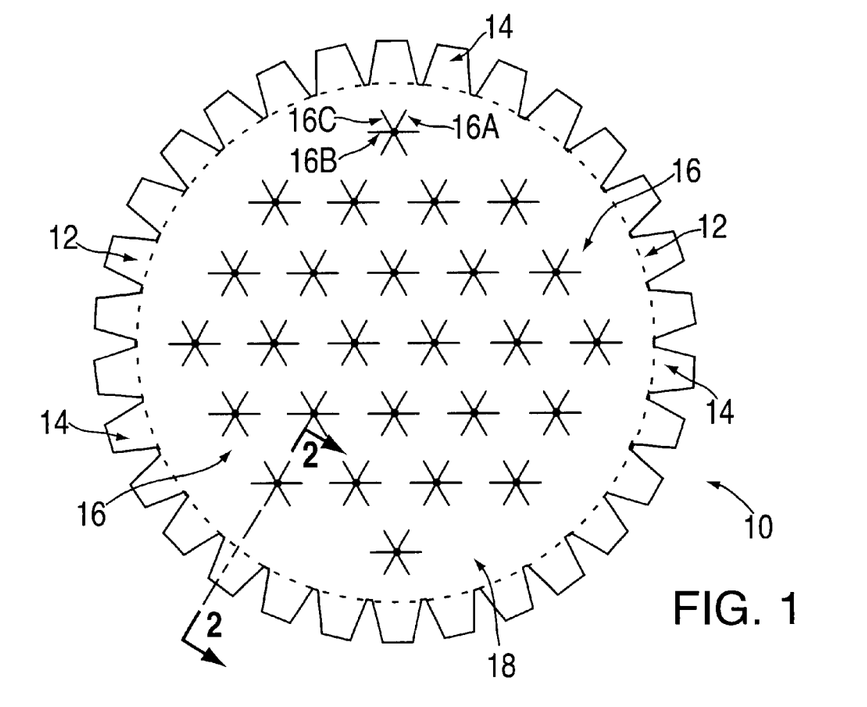
FIG. 1 depicts a brazing foil preform according to a first preferred embodiment of the invention.

FIG. 1 depicts a brazing foil preform 10 according to a first performed embodiment of the invention. The brazing foil preform has a generally circular configuration which is indicated by the dotted line 12 on the figure, from which depend one or more tabs 14. According to this preferred embodiment, the diameter of the circle defined by the dotted line corresponds to the diameter of the plate upon which the brazing foil preform will be installed, and the plurality of tabs 14 are part of the brazing foil preform. It is intended that these will be folded or bent such that the fold or bending line is approximately coincident with the dotted line 12, which corresponds also to the edge of a plate. The size and dimensions of these tabs 14 should be suitably determined in order to appropriately accommodate the plate. The brazing foil preform also includes at least one but preferably a plurality of perforations 16 which conveniently are formed by slits passing through the brazing foil preform. On FIG. 1, each of these perforations are identical, and each individual perforation is formed by three slits 16a, 16b, and 16c each being approximately or identical in length, each slit intersecting at their midpoint, and each equally radially divided. However, it is to be clearly understood that this need not be the case and that the perforations 16 need only be discontinuities which pass through the foil; their geometry is not always critical. However, according to preferred embodiments, the perforations are in the form of one or more slits such that they form one or more flaps which are adapted to be bent or folded such that when one or more shells are assembled with the plate, and thereafter the brazing foil preform is applied to the surface of the plate (and the end of the tubes) that the one or more flaps can be bent down inwardly into the interior of the one or more tubes. According to the embodiment illustrated on FIG. 1, a plurality of these flaps also ensures that there is a reduced likelihood of fracturing or breaking of the amorphous metal foil when it is bent. As is known to skilled practitioners in the art, foils of amorphous metals are typically quite brittle and are also typically quite difficult to machine or cut. This lies in fact due to the unusually high hardness of these metal foils. The present applicant has observed however that when slowly bent in small radii, creases can be formed in the amorphous metal foils which do not typically break. Thus, it is particularly desirable that during any folding or bending of the amorphous foils that a relatively small radius be maintained when the brazing foil preform is bent from a substantially planar, two-dimensional form into a three-dimensional form without cracking. Ideally, the radius of bending should be maintained to be not more than approximately 1 millimeter. When a small radius such as that described above is maintained, effective creases or folds could be introduced into the amorphous metal and at the same time, the portions of the amorphous metal foil did not have particularly strong tendency to spring back or to revert to their prior, un-bent form.

Figure 2:
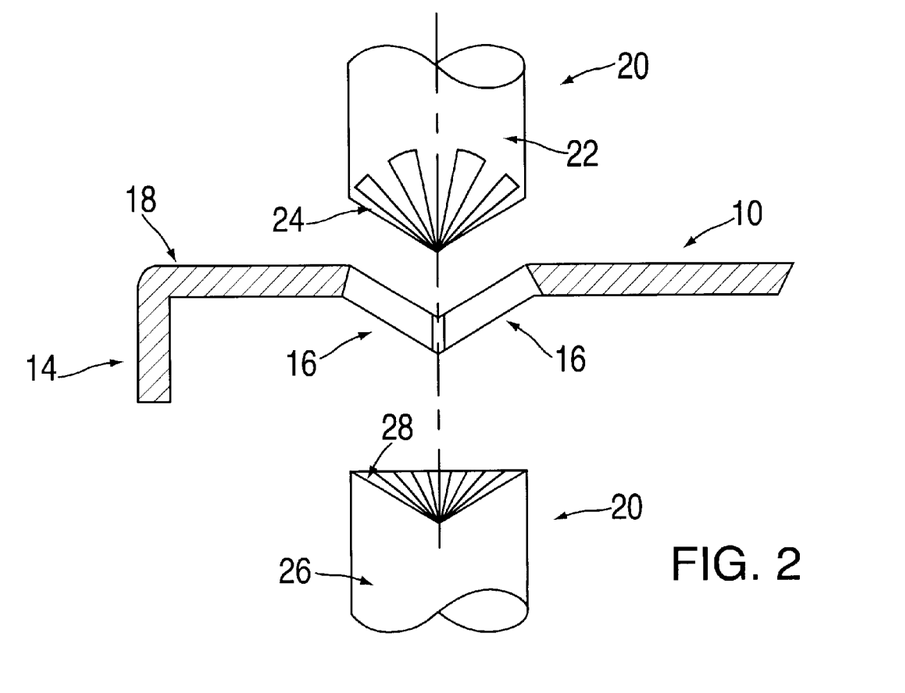
FIG. 2 depicts in side view a portion of the brazing foil preform according to FIG. 1 as well as portions of a piercing tool.

Turning now to FIG. 2, there is depicted in a side view a portion of the brazing foil preform according to the FIG. 1 as well as portions of a piercing tool 20 which is advantageously used to introduce the perforation 16 into the brazing foil preform. FIG. 2 is intended to represent a portion of the brazing foil preform of FIG. 1 along line segment "A—A" indicated on FIG. 1. Turning to FIG. 2, the piercing tool includes a plunger 22 having thereupon a plurality of cutting edges 24. The contour of the plunger 22 as well as the arrangement of any cutting edges 24 corresponds to the desired number and size of the one or more slits (16a, 16b, and 16c and the resulting perforation 16) which are to be introduced to the brazing foil preform 10.

A second portion of the piercing tool 20 is a receiving cup 26 which has a recess at one end thereof 28 which has a mating correspondence to the profile of the cutting edges 24 and the plunger 22. When present, any profile within the interior of the recess 28 should ideally correspond with the profile of any cutting edges 24. Due to the difficult handling characteristics of amorphous metals, the present inventor has found that a two-part piercing tool is advantageously used. In operation, the plunger 22 and the receiving cup 26 are retracted to form a space therebetween sufficient to allow the introduction of at least a portion of the brazing foil preform. In a cutting operation, the plunger 22 and the receiving cup 26 are then brought against one another such that deformation and cutting of the brazed metal preform occurs. Subsequently, the plunger 22 and the receiving cup 26 are retracted from one another such that the brazing boil preform can then be removed from the piercing tool 20.

While described with reference to the specific perforations and the specific configuration depicted on FIG. 1, it is of course to be understood that the configuration of the piercing tool 20 can be adapted to ultimately provide perforations 16 having different arrangements and/or configurations. Further, it is also contemplated that the piercing tool 20 includes not but one, but rather a plurality of plungers 22 and a corresponding plurality of receiving cups 26. In such an arrangement, it is clearly contemplated that during an automated or at least semi-automated manufacturing operation, a brazed foil preform may be provided with some, but preferably all required perforations 16 in one stamping operation. In a certain particularly preferred embodiment the piercing tool elements form part of a die assembly which is adapted to not only simultaneously stamp the perforation 16 through a sheet of an amorphous metal alloy but also to simultaneously stamp the overall peripheral configuration i.e., that is to say the plurality of tabs 14 in a single stamping step. In such an operation, a precise production of brazing foil preforms is assured.

Turning to FIG. 2, it is also seen thereon that subsequent to the piercing operation, and prior to the introduction of the brazed foil preform onto a shell and tube assemblage that the tabs 14 are preferably bent to be substantially perpendicular to the primary planar face 18 of the brazed foil preform 10. With regard to the individual flaps formed of the amorphous metal foil intermediate, the slits (16a, 16b, 16c) these need not necessarily be bent to form an angle with the primary planar face 18, but desirably the resultant angle is between approximately 0°–90° with respect to the primary planar face 18 of the brazing foil preform 10.

In view of the foregoing description, it can be seen that brazing foil preforms provided by the present applicants provide a substantial technical advance in the art relating to the manufacture of brazed assemblies, and in particular heat exchangers of the shell-and-tube variety. The use of a brazed foil preform such as described herein, allows for the repeatable and reliable manufacture of a brazing foil preform which is dimensioned to particularly sized arrangement of tubes and plates. Thus, for any production run where a plurality, and in particular a large number of shell and tube heat exchangers of a particular configuration are to be fabricated, the use of the brazing foil preforms described herein provides for a particularly expedient method whereby production can occur. At the same time, it is also significant not to overlook the substantial distinctions between the composition of the brazed foil preforms described herein, and the current state of the art with relation to brazing filler metal compositions in powder form, especially in relation to amorphous metal paste compositions and the assembly of shell and tube type heat exchangers. It is particularly significant to point out that according to preferred embodiments, no organic binders, or other organic materials which are known to be the cause of failure are present in the brazing foil preforms according to the present invention. This substantially reduces the likelihood of failed joints, and this is particularly significant where a large number of brazed joints need be simultaneously be produced. This is a particularly important advantage in shell and tube type heat exchangers particularly where a large number of tubes, are to be reliably brazed to one or more plates. This technical advantage is even more beneficial in view of the known-art fabrication techniques for shell-and-tube heat exchangers of small sizes. The substantially uniform thickness of the brazed foil preform, coupled with the precise placement of slits (or other perforations) which correspond to the placement of tubes on plates substantially minimizes any possible manufacturing error which are frequently experienced in known-art fabrication techniques. Most, if not all known-art technical risks are substantially or completely eliminated with the use of the brazing foil preforms and the production processes described herein.

Figure 3:
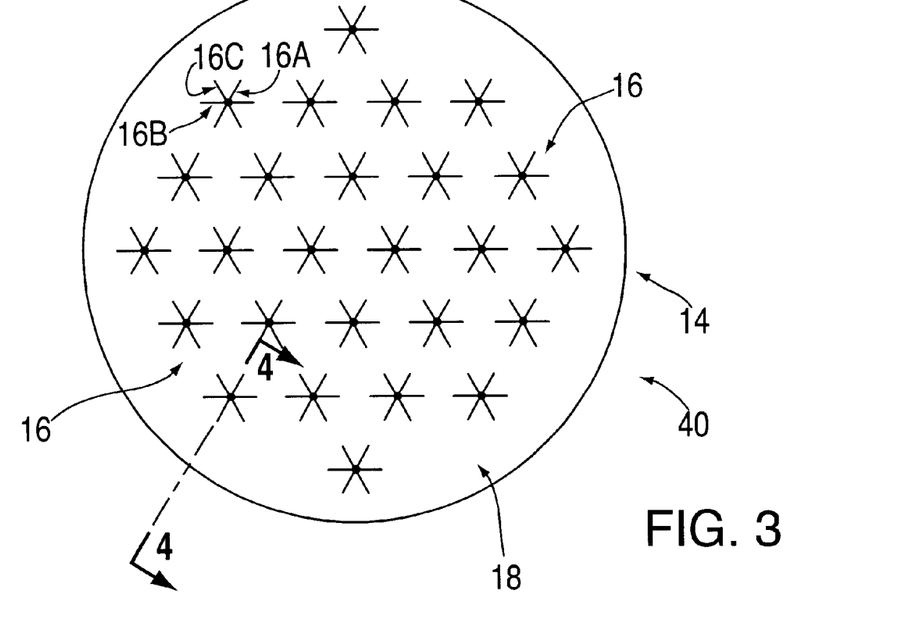
FIG. 3 depicts an alternative embodiment of a brazing foil perform.

Turning now to FIG. 3, there is depicted an alternative embodiment of a brazing foil preform 40 which is similar in many respects to that described in FIG. 1. In the figures, like elements are similarly labeled and serve the same functions as described previously. The primary distinction between the brazed foil form 40 of FIG. 3 and the brazing foil preform 10 illustrated in FIG. 1 lies in the fact that in the embodiment of FIG. 3, no peripheral tabs (14) are present. This brazing foil preform adapted to be used in the assembly of shell-and-tube type heat exchangers which have plates stamped which have different configurations than those intended to be used with the brazed foil performs 10 illustrated on FIG. 1. Rather, the brazing foil preform illustrated in FIG. 3 is typically intended to be used in conjunction with a brazing foil preform strip 60 is illustrated on FIG. 5. The length of the brazing foil preform strip 60 is intended to correspond to the circumference of the plate upon which the brazing foil preform strip 60 is intended to be installed. Additionally, as can be seen from the drawings according to a preferred embodiment, the brazing foil preform strip also includes a plurality of tabs 62 extending from one side thereof which are intended to fulfill the same functions as the tabs 14 illustrated on FIG. 1. As can be seen by inspection, these tabs 62 have a "saw tooth" profile, that is to say, that each is essentially a triangle having a base which coincides with the dotted line 64 which is intended to be the fold or crease line which corresponds to the dotted line 12 of FIG. 1. While advantageous, other profiles may also be used.

Figure 4:
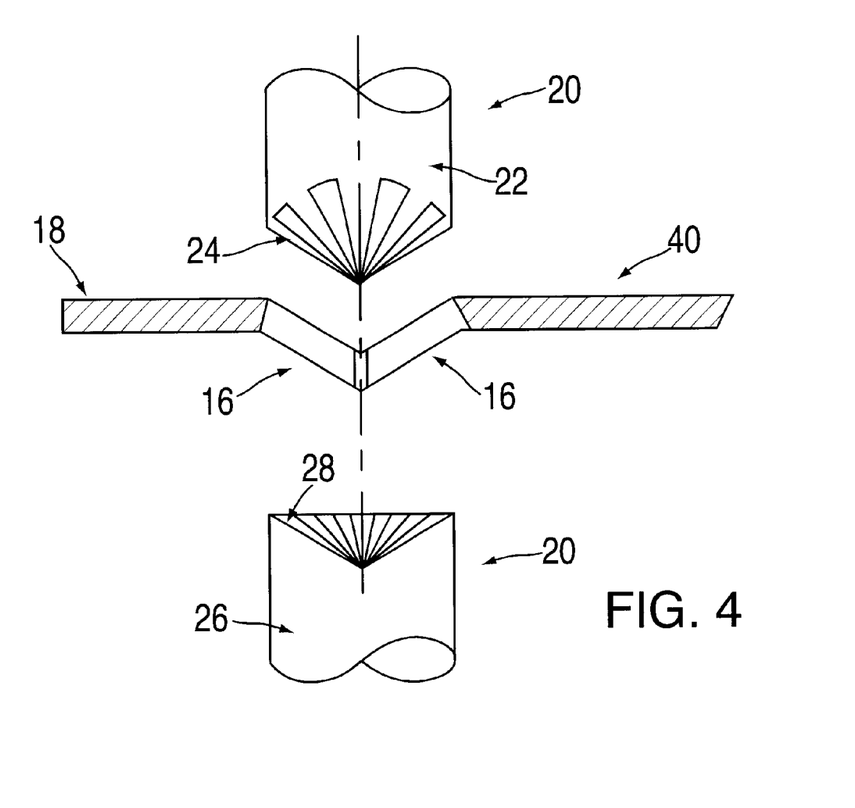
FIG. 4 illustrates in side view a portion of the brazing foil preform according to FIG. 3 as well as portions of a piercing tool.

Turning now to FIG. 4, there is shown a portion of the brazing foil preform 40, the piercing tool 20 illustrating the formation a perforation 16 through the brazing foil preform 40. Again, the operation of the piercing tool 20 upon the brazing foil preform 40 corresponds to that as described previously with respect to FIG. 2.

Figure 6:
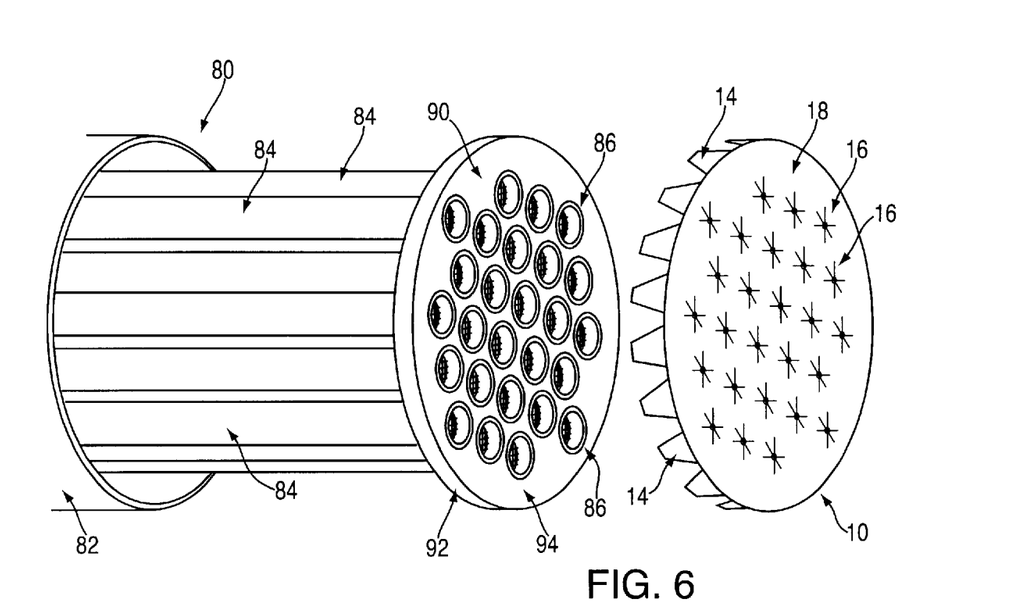
FIG. 6 depicts a portion of a conventional shell-and-tube heat exchanger in a partially disassembled state.

Turning now to FIG. 6, there is depicted a portion of a conventional shell-and-tube heat exchanger 80 in a partially disassembled state. Therein is depicted a part of a shell 82, a plurality of tubes 84, each having an end 86 extending through a suitably dimensioned passage through a plate 90. As an inspection of FIG. 6 will confirm, the diameter of the plate 90 is dimensioned to be fittable within the inside diameter of the shell 82, and to facilitate this its edge 92 is tapered. It is also contemplated that the outer diameter of the plate 90 should have a small clearance relative to the inner diameter of the shell 82. This clearance between the shell 82 and the plate 90 is usually at least slightly larger than the thickness of the brazing foil preform 10 also depicted on FIG. 6. The reason for this clearance is that it is contemplated that the tabs 14 depending from the major planar face 18 of the preform 10 are placed to be in contact with the edge 92 of the plate 90 prior to the brazing of the brazing foil preform 10 to form brazed joints. Similarly, as also can be seen by inspection of FIG. 6, the perforations 16 present and passing through the planar face 18 are also dimensioned and arranged such that they coincide with the placement and dimensions of the ends of the tubes 86. As has been described previously with reference to the manufacture of the brazed foil performs 10, this can be readily done in a reliable and repeatable manner.

With regard to the assembly steps required, it is required only that the brazing foil preform 10 be suitably positioned against the primary face 94 of the plate, that the tabs 14 be folded to contact or at least to extend along side the tapered edge 92, and that the perforations 16 correspond with suitable positioned tube ends 86 and the plate 90. Thereafter, this assemblage can be inserted into the shell 82. The next operation, a brazing step, can proceed in accordance with the specific requirements necessary for the materials of construction of the assembly, and with regard to the composition of the amorphous metal alloy used to form the brazing foil preform.

Figure 7:
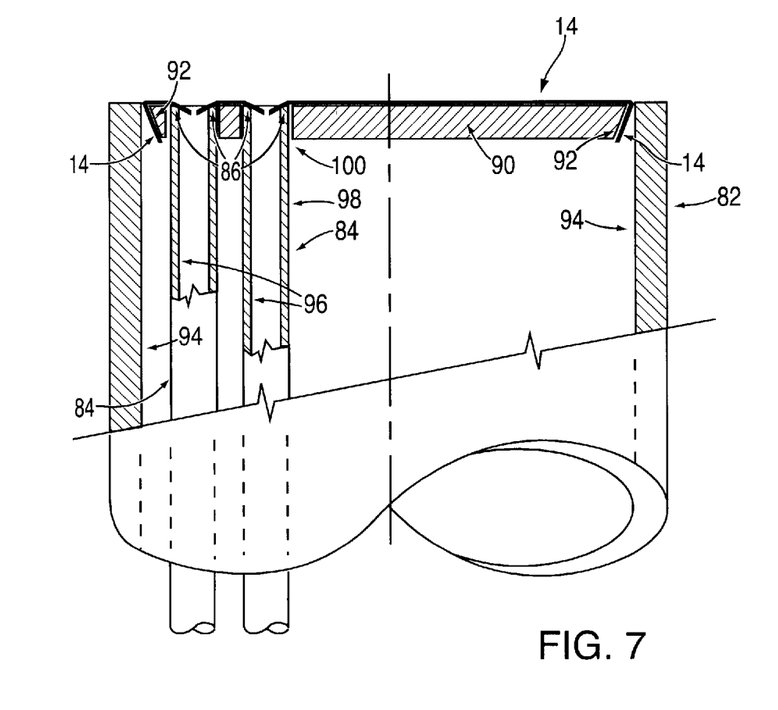
FIG. 7 illustrates a partial representation of an assembly depicted in FIG. 6.

Turning now to FIG. 7, there is depicted a cross-sectional view of certain features of the elements described with reference to FIG. 6. FIG. 7 corresponds to the final relative placement of the shell 82, the plate 90, the brazing foil preform 10 as well as two tubes 84. For sake of clarity, the depiction of further additional tubes as well as further additional holes passing through the plate 90 have been omitted. As can be seen from a careful review of the relevant portions of FIG. 7, the tabs 14 are interposed between the tapered edge 92 of the plate 90, and the inner wall 94 of the shell 82. A close tolerance fit is depicted in the drawings, but this is not necessary. It is only required that the plate and the shell be dimensioned such to permit for the placement of the tabs 14 therebetween and, that subsequent to brazing, sufficient material of the brazing foil preform 10 be present such that a reliable brazed joint can be formed. Similarly, the flaps formed in the regions intermediate of the slits forming each perforation 16 extend inwardly into the interior of the individual tubes 84. As can be seen on the drawing, these are not necessarily in contact with the interior wall of each tube 96; it is only required that the brazing foil preform 10 be capable of physically contacting both the end of each tube 86 and the plate 90 at the same time.

It will also be understood that variations in the relative positions of the elements depicted in FIGS. 6 and 7 are also contemplated to be within the scope of the invention. For example, in one variation the plate 90 is not essentially coincident with the end of the shell 82 but can extend outwardly, or extend inwardly thereof.

It is also contemplated that a "reverse" arrangement of the elements be made. In such a reverse arrangement, the major planar face 18 of the brazed foil preform 10 is placed on the side of the plate 19 opposite to that shown on FIG. 7, and the ends 86 of each tube 84 are passed through the perforation 16. In such a manner, the dependent flaps of each perforation are interspersed between the exterior wall 98 of each tube and the interior of the holes 100 passing through the plate 90. Similarly, the tabs 14 would be positioned intermediate the edge 92 of the plate 90, and the interior wall 94 of the shell 82, albeit with the ends of each of the tabs 14 facing outwardly from the interior of the assembled shell-and-tube exchanger. In this reverse arrangement, the brazing foil preform 10 is on the face of the plate 90 which is on the interior of the shell-and-tube assembly. Such a reverse arrangement may be advantageous particularly when a shell and tube assembly having a plurality of tubes with plates at opposite ends of the tubes, one plate may include a brazing foil preform 10 applied on the face of a first plate in accordance with the embodiment shown on FIG. 6, while the other plate at the opposite end of the tubes may have a brazing foil preform 10 applied in a reverse arrangement as described above. Such an arrangement of the brazing foil preforms greatly facilitates the insertion of the shell-and-tube assembly into the shell 82.

Figure 8:
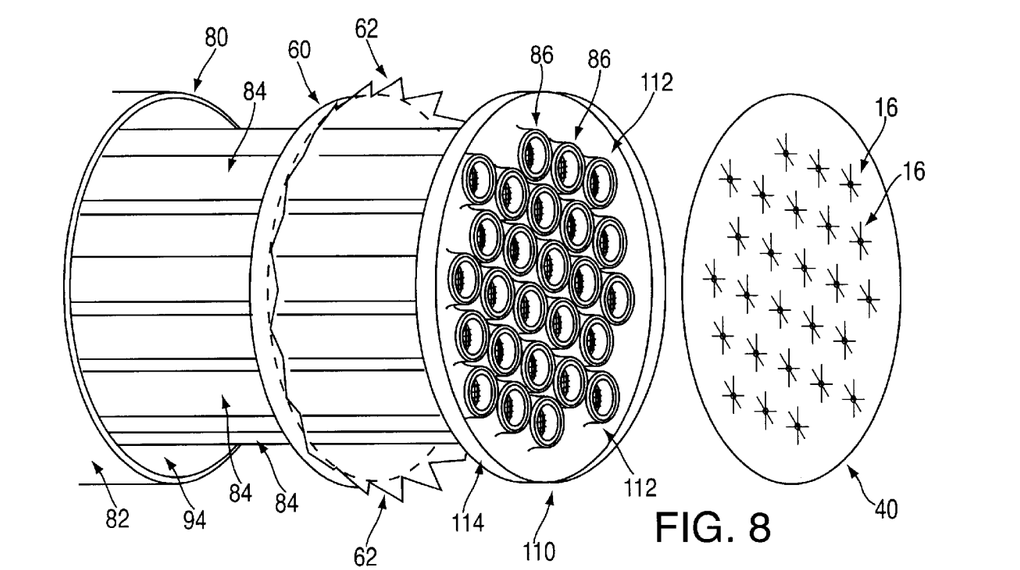
FIG. 8 depicts a further a portion of a conventional shell-and-tube heat exchanger in a partially disassembled state.

FIG. 8 depicts a still further preferred embodiment of the invention. Therein a stamped plate 110 which includes a plurality of passages there through 112, each of which is adapted to receive an end 86 of one of a plurality of tubes 84 which form part of a shell-and-tube assembly. Similarly, to the arrangement of FIG. 6, the stamped plate 110 includes an edge 114 which is adapted to be fittable within the interior wall 94 of the shell 82 when the shell-and-tube heat exchanger is assembled. Further shown on FIG. 8 is a brazing foil preform 40 corresponding to that depicted on FIG. 3, as well as the brazing foil preform strip 60 depicted on FIG. 5. Again, as has been generally described with reference to FIG. 6, the brazed foil preform 40 includes a plurality of suitably dimensioned and suitably positioned perforations 16 which correspond to the arrangement of the tube ends 86 and the stamped end plate 110. A distinction can be seen in that as the brazing foil preform 40 includes no peripheral tabs (such as tabs 14 of FIG. 1), and the diameter of the brazed foil preform 40 is intended to fit within the confines of the stamped plate 110. The diameter is not critical; it is only required that portions of the brazed foil preform 40 simultaneously make contact with the tube ends 86 and the holes 112 passing through the stamped plate 110. This arrangement is more clearly discussed and described with reference to FIG. 9. Further, as can be seen in FIG. 8, the brazed foil preform strip 60 is also intended to have a length which is equal to or greater than the diameter of the stamped plate 110. As is shown in FIG. 8, the brazing foil preform 60 is arranged to generally form a circle and is adapted to be placed such that at least part of said brazing foil preform strip 60 can be interposed between at least a portion of the shell 82 and the stamped plate 110. In such a manner, during the heating and brazing step, a brazed joint can be insured between the shell 82 and the stamped plate 110.

Figure 9:
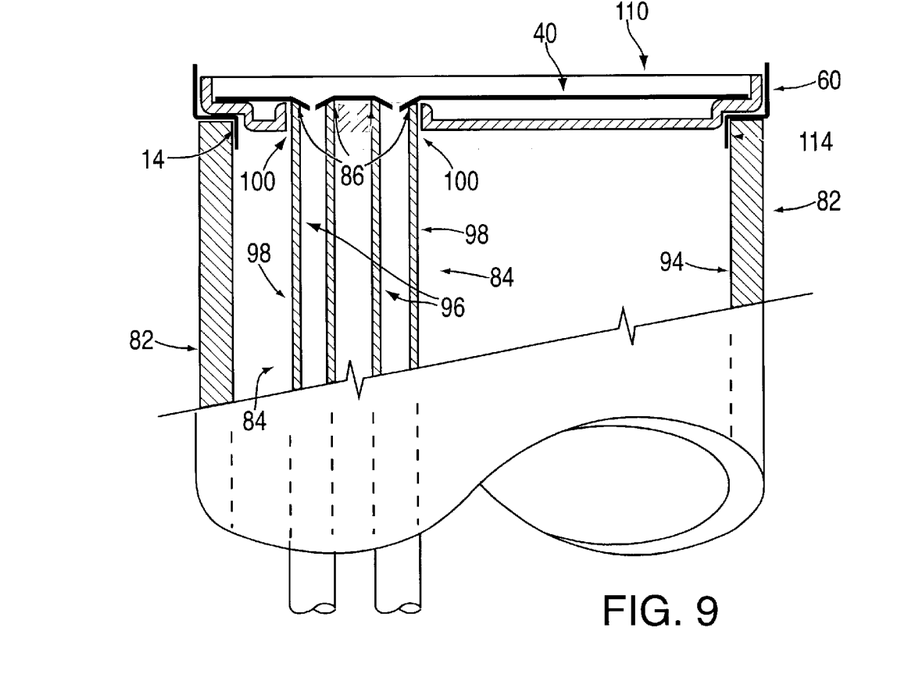
FIG. 9 illustrates a partial representation of an assembly depicted in FIG. 8

Turning now to FIG. 9, there is shown a partial representation of the assembly depicted in FIG. 8. As can be seen thereon, the brazed foil preform 40 simultaneously contacts at least portions of the stamped plate 110, and the ends 86 of the tubes 84. Again, as can be seen on FIG. 9, portions of the flaps formed by the perforations 16 are deflected and bent so to be directed inwardly towards the interior of the tubes 84. As also can be seen from FIG. 9, it also seen that the brazed foil preform strip 60 is juxtaposed between portions of the stamped plate 110 and the shell 82.

Subsequent to the positioning of these elements in accordance with the arrangement depicted on FIG. 9, it is contemplated that a conventional brazing step is practiced such that the brazed foil preform 40 and brazed foil preform strip 60 are at least partially melted and when cooled, form a brazed joint between the respective elements.

The present invention also provides methods for the manufacture of a heat exchanger or other assembly having brazed joints, which method includes the process steps of:
  providing a preform of a brazing foil composition of an amorphous metal alloy in contact with one or more elements of said heat exchanger or other assembly during the fabrication thereof; and,
  subsequently subjecting the heat exchanger or other assembly to suitable conditions in order to effectuate at least partial melting of the preform formed of a brazing foil composition to form brazed joints.

One technique for the fabrication of a shell-and-tube type heat exchangers utilizing the brazing foil performs according to the invention is described with reference to FIG. 10 which depicts a partially assembled shell-and-tube heat exchanger including the placement of brazing foil performs according to FIG. 1. According to this technique, which is partially illustrated with respect to FIG. 10, plate 90A is provided with a brazing foil preform 10 such as described with reference to FIG. 1. This plate 90A is inserted within one end of a shell 82 so to ensure that the tabs 14 are positioned between the edges of the plate 90A, and the inner diameter of the shell 82. The brazing foil preform 10 is positioned upon the face of the plate 90A which is oriented outward from the interior of the shell 82. In a next fabrication step, tubes 84A, 84B are inserted through the open end of the shell 82 in the direction of the arrow "a" so to ensure that at least one end of each of the tubes 84A is inserted within the plate 90A. (Those already inserted indicated as 84A, those in the process of being inserted are identified as 84B). There is also provided a second plate 90B and a brazing foil preform 10 is applied to one face thereof; it is intended that the face will be oriented outward from the interior of the shell 82. To facilitate the placement of the ends of the tubes 84A, 84B into the plate 90B, and to ensure good alignment between the ends 86 of the tubes 84A, 84B, the plate 90B, and the shell 82, it may be advantageous to use guide means 120. Exemplary guide means 120 include rods which are conveniently inserted in the interior of each of the tubes 84A, 84B and which thereafter pass through the appropriate holes within the plate 90B. In this way, proper alignment of respective tube ends, and holes in the plate 90B can be assured when the plate 90B is then inserted within the ends of the shell 82. Such alignment is more clearly illustrated on FIGS. 6 and 8. Conveniently these guide means 120 are withdrawn prior to a brazing step. It is, of course, understood that the use of guide means is optional to the technique described herein.

As the next step of the technique, the thus assembled assembly is then subjected to appropriate brazing conditions to ensure formation of brazed joints between the ends of the tubes 84A, 84B, the plates 90A, 90B and at least portions of the shell 82.

In accordance with a second technique for the fabrication of an assembly useful in a shell-and-tube heat exchanger, a similar, although slightly altered sequence of assembly steps is practiced. According to this technique, first ends 86 of tubes 84 are inserted into appropriate holes in the plates 90A, 90B. Thereafter, upon the face of plate 90A which will ultimately be directed outward from the assembled shell-and-tube heat exchanger, there is placed a brazing foil preform such as depicted in FIG. 1. On the other plate 90B, there is also placed on the surface of said plate which will ultimately be directed outward from the shell 82 a brazing foil preform such as depicted in FIG. 3. Thereafter, the first plate 90A, the assembled tubes 84 and the second plate 90B are then inserted at one end of an appropriately sized shell 82 and then moved through the shell to their final positions (not depicted) in the direction of the arrow "a". In such a method, the assembly of the plates 90A, 90B, tubes 84 and the brazing foil preforms 10 act as a plunger or piston when moved through the shell 82. In order to ensure brazing of the second plate 90B to the shell 82, it is advantageous to encircle the edge of the plate 90B with either a brazing foil preform strip such as depicted on FIG. 5, or in the alternative, with the brazing foil preform ring such as depicted on FIG. 12. In this way, when the assembly is completed, a brazing foil preform 124 is in contact between the edges 92 of each of the plates 90A, 90B as well as upon the exterior facing faces of the plates 90A, 90B and the ends of each of the tubes 84.

Figure 10:
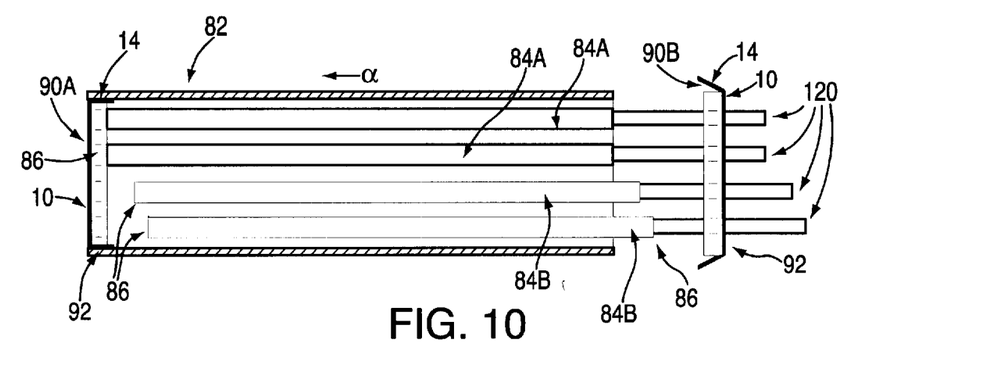
FIG. 10 depicts a partially assembled shell-and-tube heat exchanger including the placement of brazing foil performs according to FIG. 1.
Figure 11:
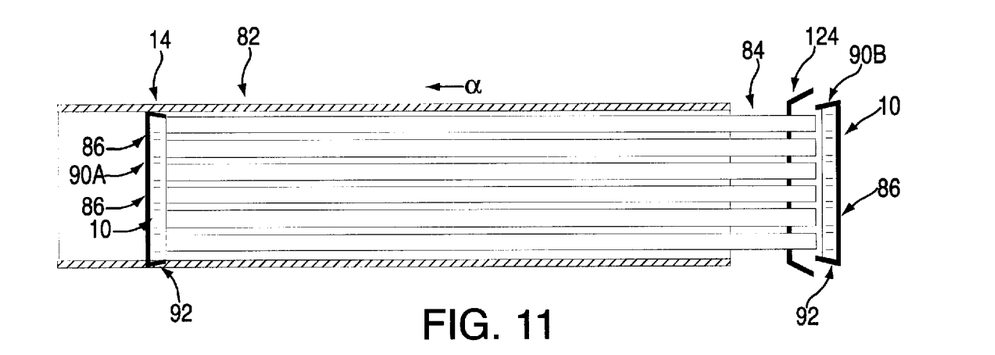
FIG. 11 illustrates depicts a partially assembled shell-and-tube heat exchanger including the placement of brazing foil performs according to FIGS. 1, 3 and 12.

Thereafter, as has been discussed with respect to FIG. 10, the assembly is then subjected to appropriate conditions in order to ensure that brazing occurs.

Figure 5:
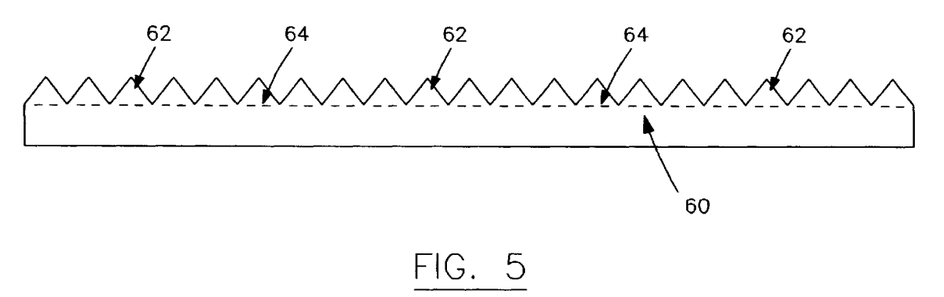
FIG. 5 depicts a brazing foil perform strip which may be used in conjunction with he brazing foil perform shown on FIG. 3.
Figure 12:
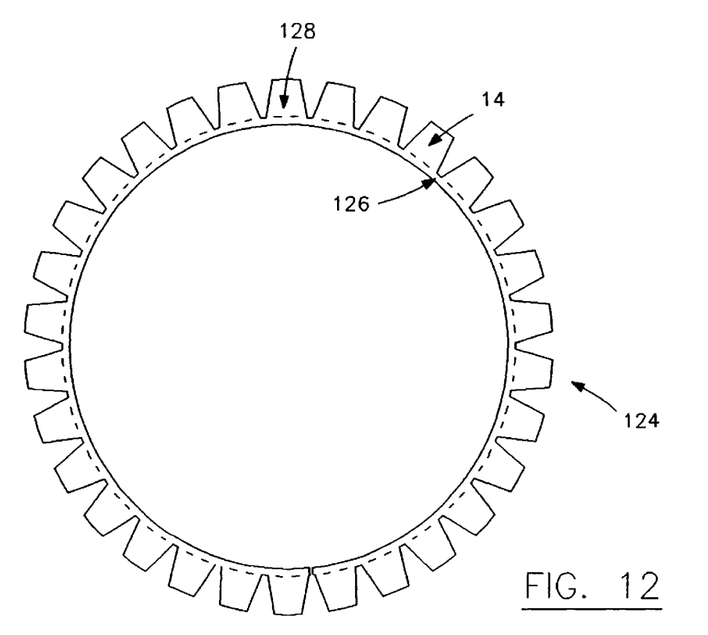
FIG. 12 depicts a brazing foil perform ring which may be used in conjunction with he brazing foil perform shown on FIG. 3.

As has been mentioned briefly, FIG. 12 is an alternative brazing foil preform ring 124 which can be used in place of the brazing foil preform strip depicted on FIG. 5. The brazing foil preform ring 124 includes a series of peripheral tabs 14 depending from an inner circular region 126. As can be seen from FIG. 12, the dotted line 128 indicates the fold line at approximately the place wherein the tabs 14 can be bent out from the plane of the circular face 126 and form a 3-dimensional preform which is particularly useful in conjunction with a brazing foil preform such as depicted on FIG. 3.

Figure 13:
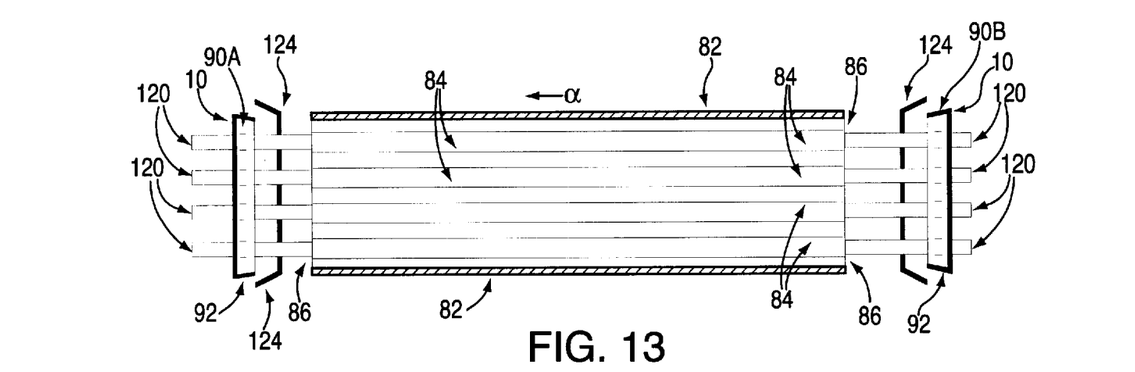
FIG. 13 depicts a partially assembled shell-in-tube heat exchanger, including the placement of brazing foil performs according to FIGS. 3 and 6 or 12.

In accordance with the third technique for the fabrication of an assembly useful in the production of a shell-in-tube heat exchanger is discussed with reference to FIG. 13. Therein, there is depicted a sectional view of a partially assembled shell-in-tube heat exchanger including the placement of brazing foil performs 10 upon each of two end plates 90A, 90B as well as a brazing foil preform 124 at each end of the shell 82 intermediate each end and one of the aforesaid plates 90A, 90B. The configuration of the brazing foil preforms 124 can be in accordance of either the brazing foil preform strips such as described in FIG. 5, or the brazing foil preform ring such as described with reference to FIG. 12.

According to this technique, there are also advantageously utilized guide means 120 which are beneficial in ensuring good alignments between the ends 86 of each of the tubes 84, and each of the plates 90A, 90B. According to this technique, each of the tubes 84 has one or more guide means 120 associated therewith. The guide means are pass through suitably dimensioned holes in each of the plates 90A, 90B. Upon the face of each of the plates 90A, 90B, which will ultimately be directed outward from the interior of the shell-in-tube heat exchanger, is placed a brazing foil preform according to that discussed with reference to FIG. 3. Subsequently, plate 90A is moved in the direction opposite to the arrow "a" such that it is appropriately inserted within the shell 82 and further such that the ends 86 of each of the tubes 84 is inserted into a suitably dimensioned hole within the plate 90A. Further, care is taken to ensure that the brazing foil preform 124 is also positioned intermediate the tapered edge 92 of the plate 90A, and the interior wall of the shell 82. In a similar fashion, the second plates, 90B, is also similarly inserted into the interior of the shell 82, the opposite ends of the tubes 84 is inserted into suitably sized holes within said second plate 90B, and the brazing foil preform 124 is also positioned intermediate the tapered edge 92 and the interior wall of the shell 82. Conveniently, the guide means 120 are removed from the thus assembled shell-in-tube heat exchanger, and thereafter said shell-in-tube heat exchanger is subjected to appropriate conditions in order to solidify the brazing foil performs and to form braze joints.

It will of course be understood that the utility of the present invention is not limited to the manufacture of heat exchangers but also finds use in any application wherein it is desired to join two or more metal parts by brazing.

EXAMPLES

Example 1

A brazing foil preform such as depicted in FIG. 1 is produced. A metal cutting die having a configuration appropriate for stamping the brazing foil preform 10 illustrated in FIG. 1 is produced. This die is then utilized to stamp a brazing foil preform as depicted in FIG. 1 and a single stamping operation. According to this example, it is contemplated that the perforations 16 are also simultaneously stamped in this single stamping operation.

Example 2

A brazing foil preform such as depicted in FIG. 1 is produced in a two-step stamping operation. First, a metal cutting die having the configuration for stamping a brazing foil preform according to FIG. 1, but absent perforations 16, is used to stamp a preform from a sheet, ribbon or strip of an amorphous metal alloy. Subsequently, a piercing tool such as depicted in FIG. 2 is used to form the perforations 16 as shown in FIG. 1.

Example 3

A brazing foil preform such as depicted in FIG. 3 is produced in accordance with the process outlined with reference to Example 1. According to the present example, however, the configuration of the metal cutting die corresponds to the shape of the brazing foil preform 40 as depicted on FIG. 3.

Example 4

A brazing foil preform such as depicted in FIG. 3 is produced generally in accordance with the process steps recited in Example 2. According to this example, however, the shape of the brazing foil preform 40 is in accordance with the configuration of FIG. 3.

A shell-in-tube tube heat exchanger assembly is produced from a plurality of tubes having two ends, a first plate having at least one hole passing therethrough dimension admits one end of the tube, and a second plate having the hole dimension to admit the other end of the tube, a shell being dimensioned to accommodate the ends, and a plurality of tubes, and brazing foil performs such as depicted on FIG. 1. The appropriate tube ends are inserted into appropriate holes in each of the plates, and the brazing foil performs are placed upon the faces oriented outwardly from the interior of the shell. The assembly of brazing foil performs, plates and plurality of tubes are then provided to the interior of the shell, and subsequently this assembly is subjected to appropriate brazing conditions in order to at least partially melt the brazing foil preform and to perform braze joints between elements of the shell-in-tube heat exchanger. The assembly is subsequently allowed to cool.

Example 5

A brazing foil preform such as depicted in FIG. 3 is produced generally in accordance with the process steps recited in Example 2. According to this example, however, the shape of the brazing foil preform 40 is in accordance with the arrangement of FIG. 3.

A shell-in-tube tube heat exchanger assembly is produced from a plurality of tubes having two ends, a first plate having at least one hole passing therethrough dimension admits one end of the tube, and a second plate having the hole dimension to admit the other end of the tube, a shell being dimensioned to accommodate the ends, and a plurality of tubes, and brazing foil performs such as depicted on FIG. 1. The appropriate tube ends are inserted into appropriate holes in each of the plates, and the brazing foil performs are placed upon the faces oriented outwardly from the interior of the shell. The assembly of brazing foil performs, plates and plurality of tubes are then provided to the interior of the shell, and subsequently this assembly is subjected to appropriate brazing conditions in order to at least partially melt the brazing foil preform and to perform braze joints between elements of the shell-in-tube heat exchanger. The assembly is subsequently allowed to cool.

Additionally, a brazing foil preform strip 60 is also introduced between the edges of each of the plates and the interior wall of the shell.

While described in terms of the presently preferred embodiments, it is to be understood that the present disclosure is to be interpreted as by way of illustration, and not by way of limitation, and that various modifications and alterations apparent to one skilled in the art may be made without departing from the scope and spirit of the present invention.

What is claimed is:

1. A preformed article, comprising an amorphous metal by brazing foil having an irreversibly deformed, non-planar, three dimensional configuration including a primary planar face with at least one perforation passing therethrough, said article being adapted for use in the manufacture of an assembly, said manufacture comprising the brazing of a plurality of tubes to at least one plate, and the brazing of said plate to a shell encasing said plurality of tubes and said at least one plate.

2. The preformed article according to claim 1 wherein the amorphous metal alloy is a Ni- or Ni/Cr-based alloy.

3. The preformed article according to claim 1 wherein the amorphous metal alloy has a composition represented by the formula:

$$Ni_aCo_bCr_cB_dSi_eFe_fMo_gW_hX$$

where the subscripts "a", "b", "c", "d", "e", "f", "g", and "h" are all in weight percent and wherein, "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities present to about 1 weight percent, and "a" is the balance to the total amount to 100.

4. The preformed article according to claim 1 wherein the configuration of said preformed article includes at least one bendable tab depending from said primary planar face.

5. The preformed article according to claim 1 which comprises:

a brazing foil preform having a configuration adapted to be used in the brazing of a plurality of tubes to at least one plate; and, a brazing foil preform strip having a configuration adapted to be used for brazing said plate to a cylindrical shell encasing said plurality of tubes and at least one plate.

6. A heat exchanger or other assembly having brazed joints which includes at least one preformed article formed of a brazing foil of an amorphous metal alloy according to claim 1, said three dimensional configuration having contours fitting one or more elements of said heat exchanger or other assembly.

7. A heat exchanger or other assembly having brazed joints which includes at least one, prefomed article formed of a brazing foil of an amorphous metal alloy according to claim 6 wherein the amorphous metal alloy has a composition represented by the formula:

$$Ni_aCo_bCr_cB_dSi_eFe_fMo_gW_hX$$

where the subscripts "a", "b", "c", "d", "e", "f", "g", and "h" are all in weight percent and wherein, "b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities present to about 1 weight percent, and "a" is the balance to the total amount to 100.

8. A heat exchanger or other assembly having brazed joints which is manufactured by a method that includes the process step of providing a preformed article formed of a brazing foil composition of an amorphous metal alloy incontact with one or more elements of said heat exchanger or other assembly, said preformed article having an irreversibly deformed, non-planar, three dimensional form having contours fitting said one or more elements of said heat exchanger or other assembly and a primary planar face with at least one perforation passing therethrough.

9. A heat exchanger or other assembly having brazed joints manufacture by a method according to claim 8 wherein the preformed article formed of a brazing foil of an amorphous metal alloy a composition represented by the formula:

$$Ni_aCo_bCr_cB_dSi_eFe_fMo_gW_hX$$

where the subscripts "a", "b", "c", "d", "e", "f", "g", and "h" are all in weight percent and wherein,"b" is between about 0 and 75, "c" is between 0 and about 25, "d" is between 0 and about 4, "e" is between 0 and about 11, "f" is between 0 and about 10, "g" is between 0 and about 5, "h" is between 0 and about 5, "X" represents other elements, including impurities present to about 1 weight percent, and "a" is the balance to the total amount to 100.

10. A heat exchanger having brazed joints manufactured by a method according to claim 8, said method further including the process step of subjecting the heat exchanger to, suitable conditions in order to effectuate at least partial melting of the preform formed of a brazing foil composition to form brazed joints.

11. A heat exchanger having brazed joints manufactured by a method according to claim 8, said elements comprising a plurality of tubes, at least one plate, and a shell, and said method further including the process steps of brazing said plurality of tubes to said plate and brazing said plate to said shell encasing said plurality of tubes and said at least one plate, said brazing steps being carried out using said preformed article.

* * * * *